United States Patent [19]
Nakaho

[11] Patent Number: 5,855,072
[45] Date of Patent: Jan. 5, 1999

[54] STEERING WHEEL ROTATIONAL ANGLE DETECTING APPARATUS

[75] Inventor: Junichi Nakaho, Niwa, Japan

[73] Assignee: Kabushiki Kaisha Tokai-Rika-Denki-Seisakusho, Niwa, Japan

[21] Appl. No.: 811,178

[22] Filed: Mar. 4, 1997

[30] Foreign Application Priority Data

Mar. 25, 1996 [JP] Japan .................................. 8-068005

[51] Int. Cl.[6] ...................................................... G01B 7/30
[52] U.S. Cl. ............................ 33/1 PT; 33/1 N; 33/600
[58] Field of Search ................... 33/1 PT, 1 N, 33/534, 600

[56] References Cited

U.S. PATENT DOCUMENTS

| | | | |
|---|---|---|---|
| 4,495,700 | 1/1985 | Ernst | 33/1 PT |
| 4,625,411 | 12/1986 | Kashiwagi et al. | 33/1 PT |
| 5,297,060 | 3/1994 | Foletti et al. | 33/503 |
| 5,422,810 | 6/1995 | Brunning et al. | |
| 5,657,544 | 8/1997 | Ota et al. | 33/1 PT |

FOREIGN PATENT DOCUMENTS

| | | |
|---|---|---|
| 0 423 080 A1 | 4/1991 | European Pat. Off. . |
| 41 38 589 A1 | 4/1993 | Germany . |
| 60-134110 | 9/1985 | Japan . |

*Primary Examiner*—Christopher W. Fulton
*Attorney, Agent, or Firm*—Oliff & Berridge, PLC

[57] ABSTRACT

In a steering wheel rotational angle detecting apparatus, an engaging pin protrudes radially from a projected part of one of a steering wheel and an annular rotating member and includes a spherical portion. An engaging groove is formed at a position on the other of the steering wheel and the annular rotating member of a rotational angle detector corresponding to the position of the engaging pin. The engaging groove is configured to receive and hold the spherical portion of the engaging pin on two sides while allowing the spherical portion to move within the engaging groove. When the steering wheel is turned, the engaging pin or groove immediately transmits torque to the engaging groove or pin, respectively, thus enabling the rotational angle detector to detect rotational angle with high precision in either of the rotational directions of the steering wheel. The movable engagement of the spherical portion and the engaging groove compensates for eccentric mounting of the steering wheel and the annular rotating member, and also a deviation of their rotational axes from each other, as the spherical portion relatively moves within the engaging groove to absorb or release twist stress, thus ensuring smooth rotation of the annular rotating member.

8 Claims, 11 Drawing Sheets

STEERING WHEEL ROTATIONAL ANGLE DETECTING APPARATUS

BACKGROUND OF THE INVENTION

1. Field of the Invention

The invention relates to a steering wheel rotational angle detecting apparatus for detecting rotation of a steering wheel based on rotation of an annular rotating member that rotates in accordance with rotation of the steering wheel.

2. Description of the Related Art

A conventional apparatus for detecting rotation of a steering wheel is shown in FIGS. 10 and 11. An annular coupling member 3 that also serves as a member for detecting rotational angle of a steering wheel 2 is disposed in a central portion of a lower face of the steering wheel 2, which is fixed to an upper end of a steering shaft 1. The steering shaft 1 extends through the coupling member 3.

Three pins 3a are formed on an upper end portion of the coupling member 3, arranged along the circumference of the end portion as shown in FIG. 11. The pins 3a are fitted into recesses 2a that are formed in the positions on the steering wheel 2 corresponding to the pins 3a. By means of the pins 3a thus fitted into recesses 2a, the coupling member 3 rotates as the steering wheel 2 is turned.

A rotational angle detector 4 is disposed on a lower end portion of the coupling member 3 and surrounds the steering shaft 1. The rotational angle detector 4 has an annular rotating member 6 that is rotatably disposed in an annular case 5. The annular case 5 is fixed to, for example, a steering column (not shown). The annular rotating member 6 is provided with an engaging pin 6a protruding radially inward. The engaging pin 6a is disposed to engage with an engaging cut-out portion 3b that extends in a lower end portion of the coupling member 3 in the direction of its longitudinal axis.

A ring-like slitted plate 7 is fixed to an outer peripheral portion of the annular rotating member 6. The slitted plate 7 has a plurality of slits that extend in the circumferential direction. A photointerrupter 8 is disposed on the case 5 and covers an outer peripheral portion of the slitted plate 7.

When the steering wheel 2 is turned, the coupling member 3 correspondingly turns so that the annular rotating member 6 of the rotational angle detector 4 also rotates. As the slitted plate 7 of the annular rotating member 6 rotates, the photointerrupter 8 detects light reception signals generated by light passing through the slits of the slitted plate 7. Based on the level and phase of the light signals, the rotational angle detector 4 obtains a signal corresponding to the rotational angle and direction of the steering wheel 2, thus detecting rotation of the steering wheel 2.

Since it is difficult to completely align the rotational axis of the rotational angle detector 4 with the rotational axis of the steering shaft 1 when mounting the rotational angle detector 4, some error in the mount precision is normally inevitable. Therefore, to ensure that the annular rotating member 6 of the rotational angle detector 4 will smoothly rotate even if the rotational axes of the two components are not completely aligned, dimensional allowances in the rotational directions are normally provided in, for example, gaps between the engaging pins 3a of the coupling member 3 and the engaging recesses 2a of the steering wheel 2, and a gap between the cut-out portion 3b of the coupling member 3 and the engaging pin 6a of the annular rotating member 6.

However, such dimensional allowances cause problems. That is, the annular rotating member 6 of the rotational angle detector 4 may rotate following the steering wheel 2 as long as the steering wheel 2 is turned in one direction, whereas when reversed, the steering wheel 2 rotates idly an amount corresponding to the dimensional allowances relative to the annular rotating member 6, and then re-engages with and turns the annular rotating part 6. This failure in immediate or precise transmission of rotation from the steering wheel 2 to the annular rotating member 6 of the rotational angle detector 4 hinders improvement of precision in detection of the rotational angle.

SUMMARY OF THE INVENTION

Accordingly, it is an object of the invention to provide a steering wheel rotational angle detecting apparatus that is able to detect rotation of a steering wheel with high precision regardless of the rotational directions of the steering wheel.

According to the invention, there is provided a steering wheel rotational angle detecting apparatus for detecting rotation of a steering wheel based on rotation of an annular rotating member that is rotatable in accordance with rotation of the steering wheel. The apparatus comprises an engaging protrusion formed in the steering wheel at a position adjacent the annular rotating member, the engaging protrusion having a generally spherical portion, and an engaging groove portion formed in the annular rotating member at a position corresponding to the engaging protrusion. A depression of the engaging groove portion is configured to receive the engaging protrusion such that the engaging groove portion contacts and holds the engaging protrusion while the spherical portion is sandwiched between two faces of the engaging groove portion.

Thus, when the steering wheel is turned, the engaging protrusion rotates together with the steering wheel, and torque is transmitted to the annular rotating member by the engaging groove portion, thus rotating the annular rotating member. Since the engaging protrusion is held in a contact manner by the two faces of the engaging groove portion, the annular rotating member is rotatable together with the steering wheel regardless of the rotational direction. Therefore, the steering wheel rotational angle detecting apparatus of the invention is able to precisely detect rotational angle of the steering wheel in either of the rotational directions.

If a mounting error occurs, for example, if the annular rotating member and the steering wheel are assembled eccentrically, that is, deviate from the concentric mount positions, the engaging protrusion and the engaging groove portion shift relative to each other as the steering wheel turns. When the annular rotating member and the steering wheel rotate in this manner, the spherical portion of the engaging protrusion relatively moves within the engaging groove portion while remaining in contact therewith, and a relative movement of the spherical portion of the engaging protrusion and the engaging groove portion offsets the radial deviation of the annular rotating member, absorbing or releasing twisting stress caused by the eccentricity. The steering wheel rotational angle detecting apparatus thus ensures smooth rotation of the annular rotating member.

Moreover, even if the rotational axis of the steering wheel and the rotational axis of the annular rotating member are oblique to each other when the two components are assembled, the steering wheel rotational angle detecting apparatus of the invention absorbs twisting stress and allows smooth rotating motion in substantially the same manner as described above.

Preferably, the engaging groove portion has a guide groove portion that is formed in an opening end portion of the engaging groove portion for receiving the engaging protrusion, and the guide groove portion has an opening width greater than a diameter of the spherical portion of the engaging protrusion. This preferred structure facilitates placement of the engaging protrusion into the engaging groove by providing a guide surface on which the spherical portion can slide into the engaging groove, thus improving assembling efficiency.

According to the invention, it is also possible to provide an engaging protrusion in the annular rotating member and provide an engaging groove portion in the steering wheel. Since the relationship between the engaging protrusion and the engaging groove remains unchanged, this structure achieves substantially the same advantages as mentioned above.

BRIEF DESCRIPTION OF THE DRAWINGS

The foregoing and further objects, features and advantages of the invention will become apparent from the following description of preferred embodiments with reference to the accompanying drawings, wherein like reference numerals are used to represent like elements and wherein.

DETAILED DESCRIPTION OF PREFERRED EMBODIMENTS

Preferred embodiments of the steering wheel rotational angle detecting apparatus of the invention will be described in detail hereinafter with reference to the accompanying drawings.

Figure 1:
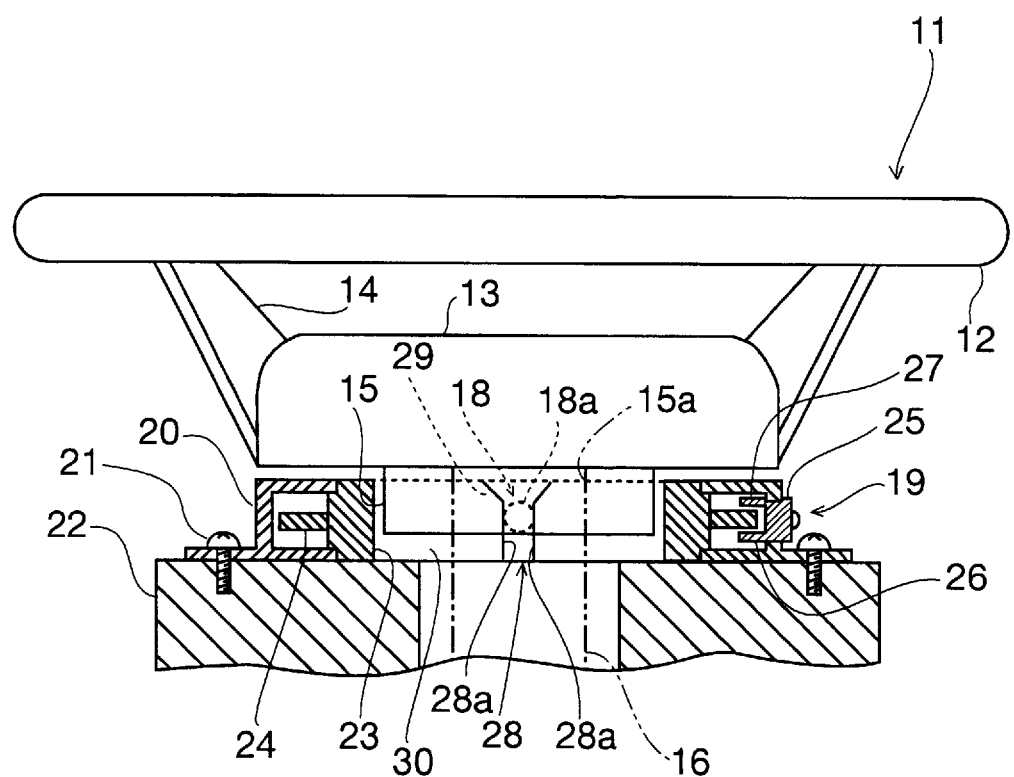
FIG. 1 is a partially sectional side view of a first embodiment of the steering wheel rotational angle detecting apparatus of the invention.
Figure 2:
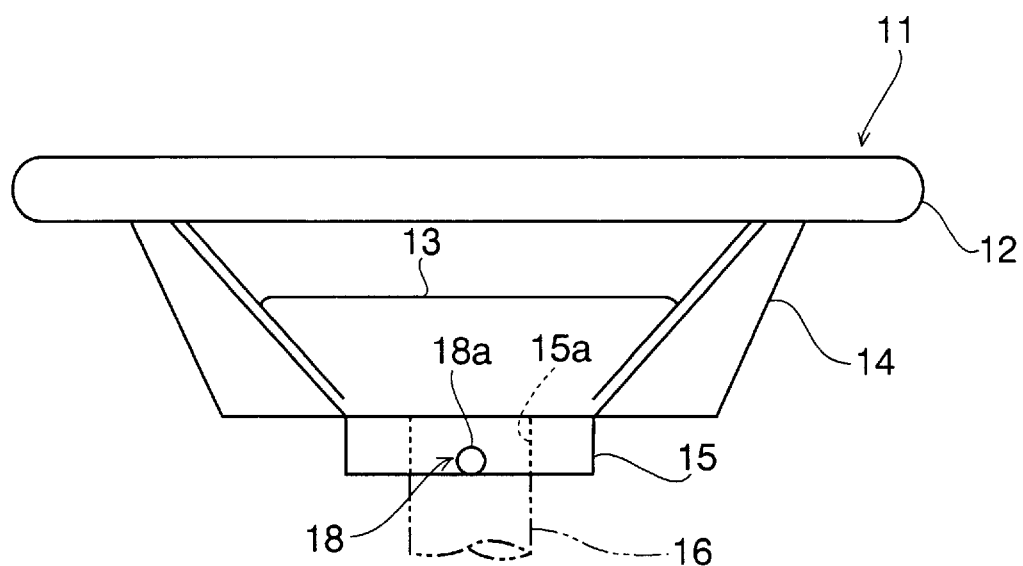
FIG. 2 is a top plan view of the steering wheel of FIG. 1.
Figure 3:
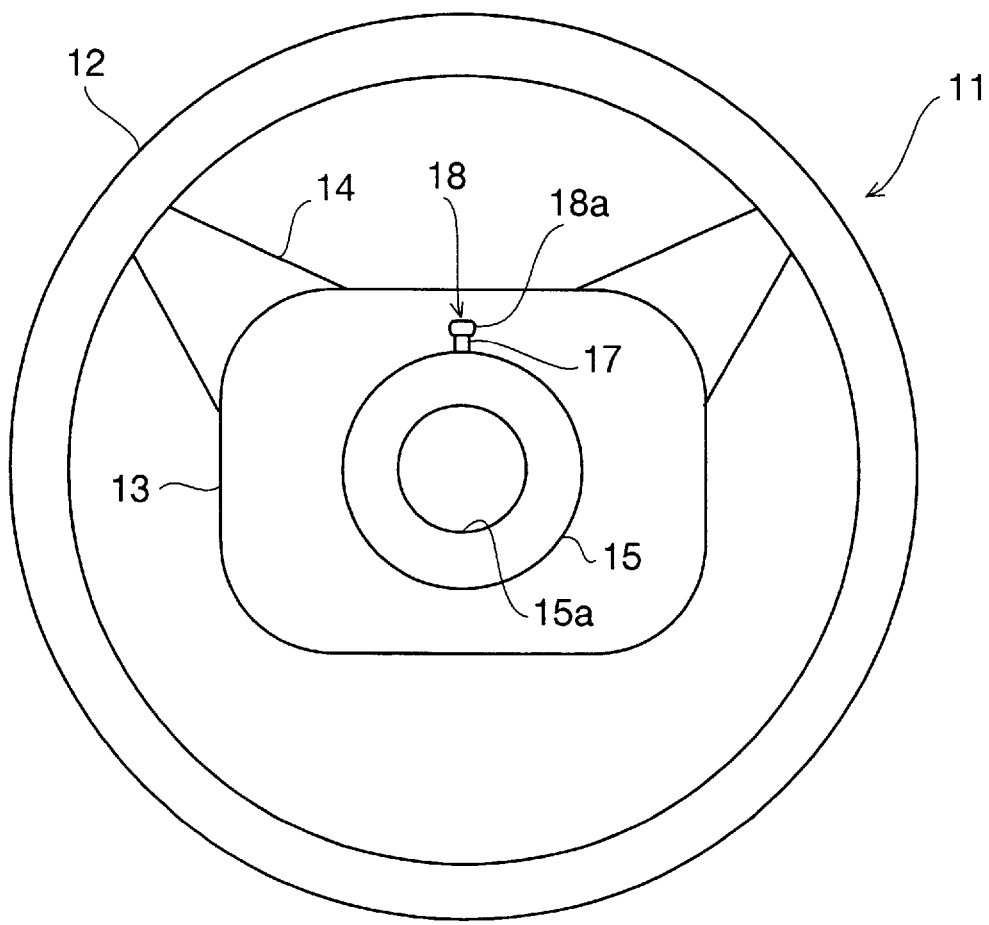
FIG. 3 is a front view of the steering wheel of FIG. 1.

A first embodiment will be described with reference to FIGS. 1 through 7. Referring first to FIGS. 2 and 3, which illustrate the exterior of a steering wheel 11 disposed on a driver seat-side of a motor vehicle, the steering wheel 11 comprises a steering wheel rim 12, a steering wheel hub 13 disposed inside the steering wheel rim 12 and below the plane of the steering wheel rim 12, and steering wheel spokes 14 connecting the steering wheel rim 12 and the steering wheel hub 13. An annular projected part 15 is fixed to a lower portion of the steering wheel hub 13, concentrically with the steering wheel 11. The annular projected part 15 protrudes in the direction of the rotational axis of the steering wheel. The annular projected part 15 is provided with a fitting hole 15a also extending in the direction of the rotational axis of the steering wheel. A steering shaft 16 is fitted and fixed into the hole 15a as shown in FIGS. 1 and 2. Thus, the steering wheel 11 and the steering shaft 16 are rotatable together.

Figure 4:
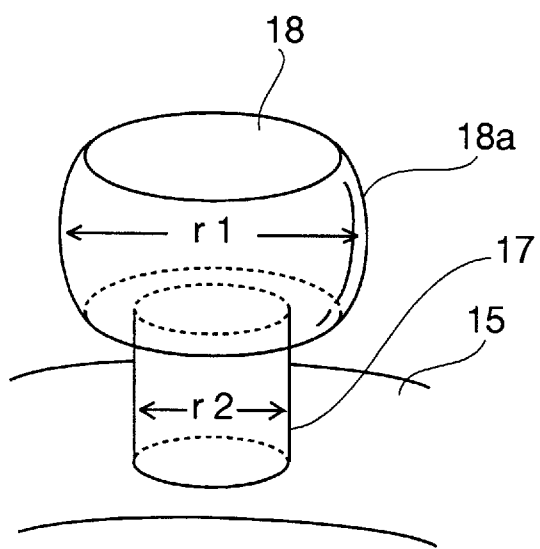
FIG. 4 is a perspective view of an engaging pin and a spherical portion according to the invention.

The projected part 15 carries an engaging pin 17, that is, an engaging protrusion, fixed to the outer peripheral surface thereof. The engaging pin 17 protrudes in a direction of a radius of the steering wheel 11. Formed on the distal end of the engaging pin 17 is a spherical portion 18 that has upper and lower flat circular surfaces that are parallel to each other, and a side spherical surface 18a extending between the flat circular surfaces, as shown in FIG. 4. The diameter r1 of the spherical portion 18 at all points is greater than the diameter r2 of the engaging pin 17.

Figure 5:
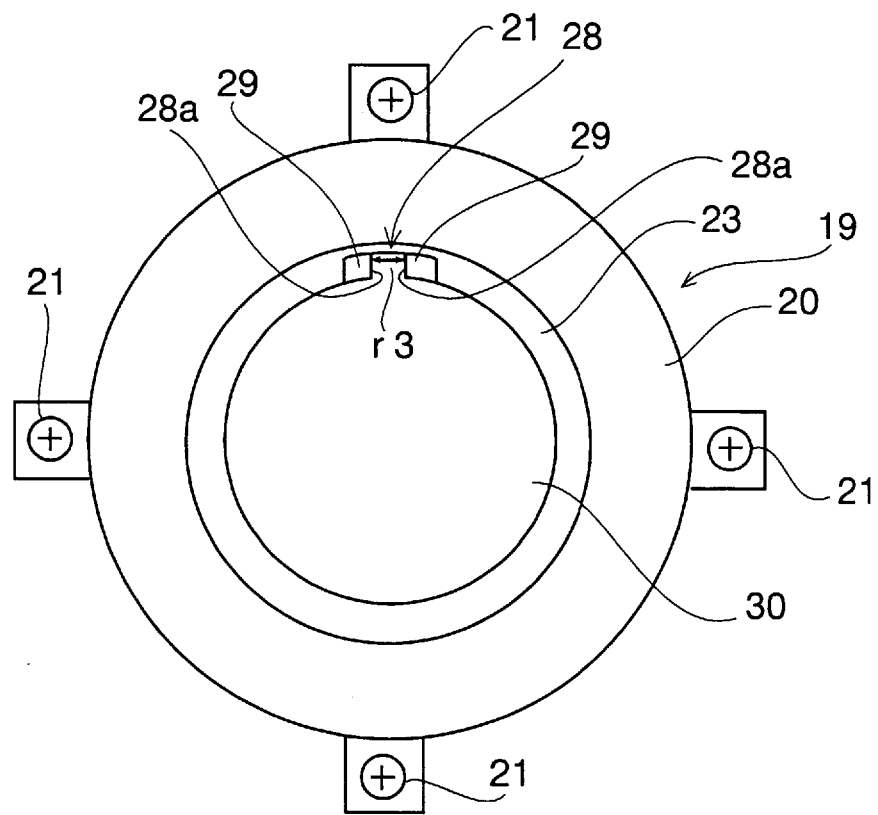
FIG. 5 is a top plan view of the rotational angle detector according to the invention.

A rotational angle detector 19 for detecting the rotational angle of the steering wheel 11 is disposed under the steering wheel 11 as shown in FIGS. 1 and 5. The steering shaft 16 extends through the rotational angle detector 19. A case 20 of the rotational angle detector 19 is secured by screws 21 to a steering column 22 through which the steering shaft 16 extends. An annular rotating member 23 is rotatably disposed inside the case 20, facing the inner peripheral surface of the case 20. A slitted plate 24 is fixed to the annular rotating member 23 so that they rotate together. The slitted plate 24 has many slits that are arranged along the circumference of the plate 24 and spaced by a predetermined pitch, forming a radial or circular pattern.

A photointerrupter 25 for detecting the rotational angle of the slitted plate 24 comprises a light emitting portion 26 and a light receiving portion 27 that face each other. The photointerrupter 25 is fixed to the case 20 in such a position that the light emitting portion 26 and the light receiving portion 27 sandwich an outer peripheral portion of the slitted plate 24 in a non-contact manner. Two pairs of light emitting and receiving elements are disposed in the light emitting portion 26 and the light receiving portion 27. The two pairs of optical elements are spaced from each other in the rotational direction of the steering wheel by an interval equal to half the width of the slits of the slitted plate 24, for detection of the rotational direction of the steering wheel 11 as described below.

The inner peripheral wall of the annular rotating member 23 has an engaging groove 28 whose depression is directed substantially in a direction along the rotational axis. The engaging groove 28 is partially defined by two flat side faces 28a facing each other. The groove width r3 (see FIG. 5) defined between the two flat side faces 28a, 28a is substantially equal to the diameter r1 of the spherical portion 18 of the engaging pin 17. An upper portion of the engaging groove 28 (a portion close to the steering wheel 11) becomes wider toward its top end, thus forming a guide groove 29.

The projected part 15 of the steering wheel 11 is disposed in a hollow 30 defined by the inner peripheral surface of the annular rotating member 23, while the spherical portion 18 of the engaging pin 17 is engaged with the engaging groove 28. In this assembly, the spherical portion 18 is inserted between the two flat faces 28a, 28a and contacts the two faces. Thus the spherical portion 18 and the flat faces 28a leave substantially no gap therebetween in the rotational directions of the annular rotating member 23.

The operation of this embodiment will next be described with reference to FIGS. 6 and 7. When the projected part 15 starts to rotate together with the steering wheel 11, the engaging pin 17 also starts to revolve, exerting a torque on the engaging groove portion 28, which holds the spherical portion 18 of the engaging pin 17 on both sides corresponding to the rotational directions. Thus, the annular rotating member 23 of the rotational angle detector 19 rotates an angle corresponding to the rotational angle of the steering wheel 11. As the slitted plate 24 rotates together with the annular rotating member 23, the photointerrupter 25 detects the number of slits passing by corresponding to the rotational angle.

Figure 6:
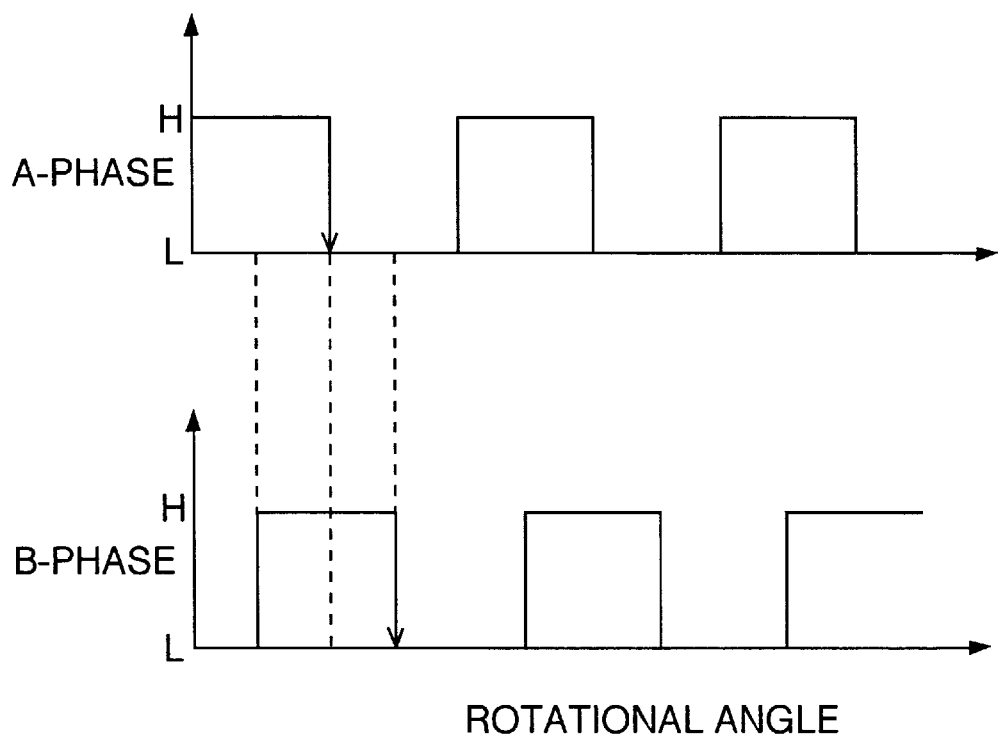
FIG. 6 shows waveforms of a detection signal.
Figure 7:
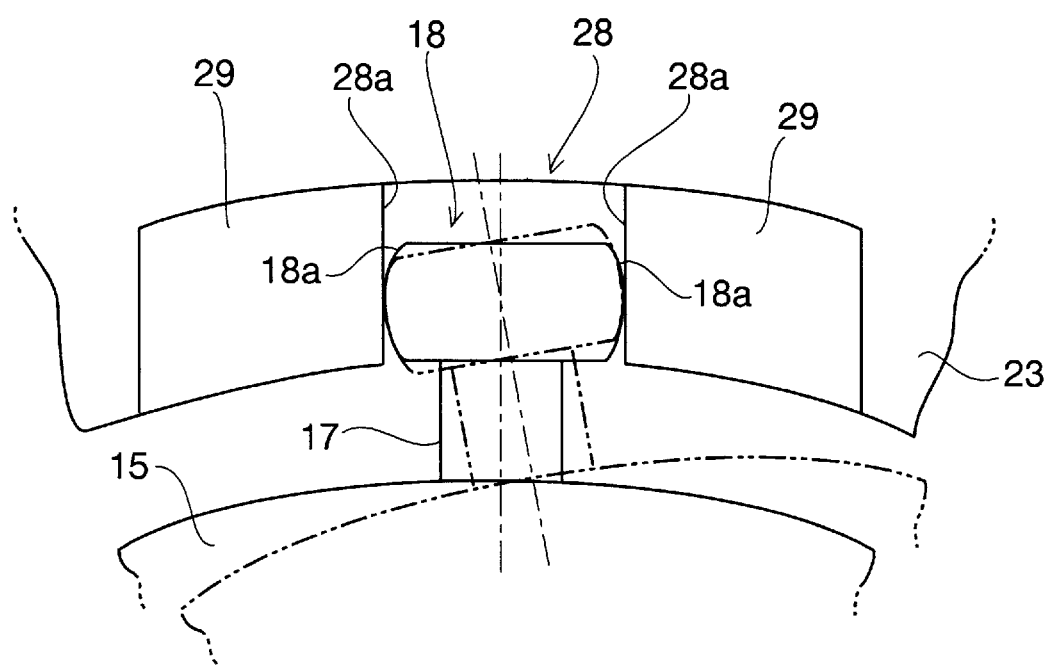
FIG. 7 illustrates the engaging pin and an engaging groove when the spherical portion of the pin is fitted in the groove.

The light receiving portion 27 of the photointerrupter 25 outputs H or L-level light reception signals corresponding to slits passing by as indicated in FIG. 6. Since the rotational angle equivalent to a slit is predetermined, it is possible to detect the rotational angle of the steering wheel 11 based on the number of slits that have passed by. In addition, since the two pairs of light emitting and receiving elements are spaced from each other by an interval equal to half the width of the slits, the rising phases of the light reception signals from the two pairs of optical elements (indicated as A-phase and B-phase in FIG. 6) reverse in order of time corresponding to the rotational directions of the slitted plate 24, thus enabling detection of the rotational direction.

The annular rotating member 23 of the rotational angle detector 19 rotates together with the steering wheel 11 without any significant lag in either of the rotational directions, since the spherical portion 18 of the engaging pin 17 of the annular rotating member 23 is held on both sides corresponding to the rotational directions by the flat faces 28a of the engaging groove 28 while substantially no gap is left between the spherical portion 18 and the flat faces 28a. Therefore, it becomes possible to detect the rotational angle of the steering wheel 11 with high precision regardless of the rotational direction of the steering wheel 11.

If the annular rotating member 23 of the rotational angle detector 19 and the steering wheel 11 are assembled eccentrically, that is, deviate from the concentric mount positions, because of, for example, a mounting error, then the spherical portion 18 and the engaging groove 28 shift relative to each other as the steering wheel 11 is turned as mentioned above. Since the spherical portion 18 is held only on the two sides corresponding to the rotational directions by the point contact with the two flat faces 28a of the engaging groove 28, the spherical portion 18 is allowed to move within the groove 28 while remaining in contact with the flat faces 28a, and a movement of the spherical portion 18 and the engaging groove 28 relative to each other offsets a radial deviation of the annular rotating member 23, thus ensuring smooth rotation and absorbing (or releasing) twist stress caused by eccentric mounting. This embodiment thus eliminates the danger of having a so-called "twisted" positional relation between the annular rotating member 23 and the steering wheel 11, and ensures that the annular rotating member 23 will always rotate smoothly (see FIG. 7).

Likewise, the structure of the first embodiment ensures and maintains smooth rotation of the annular rotating member 23 in a case where the annular rotating member 23 and the steering shaft 16 are assembled with their rotational axes angled to each other.

Even if mounting errors are present as mentioned above, the spherical portion 18, held in the engaging groove 28, revolves together with the steering wheel 11 without producing a motion error or lag in either of the rotational directions of the steering wheel 11. The first embodiment therefore makes it possible to detect the rotational angle of the steering wheel 11 with high precision.

Further, since the guide groove 29, formed in a portion of the engaging groove 28 close to the steering wheel 11, becomes wider toward the steering wheel 11, it is easy to mount the steering wheel 11 on the steering shaft 16 after the rotational angle detector 19 is mounted. That is, even if the spherical portion 18 of the engaging pin 17 deviates from the engaging groove 28, the steering wheel 11 can easily be mounted by sliding the spherical portion 18 along the face of the guide groove 29.

Figure 8:
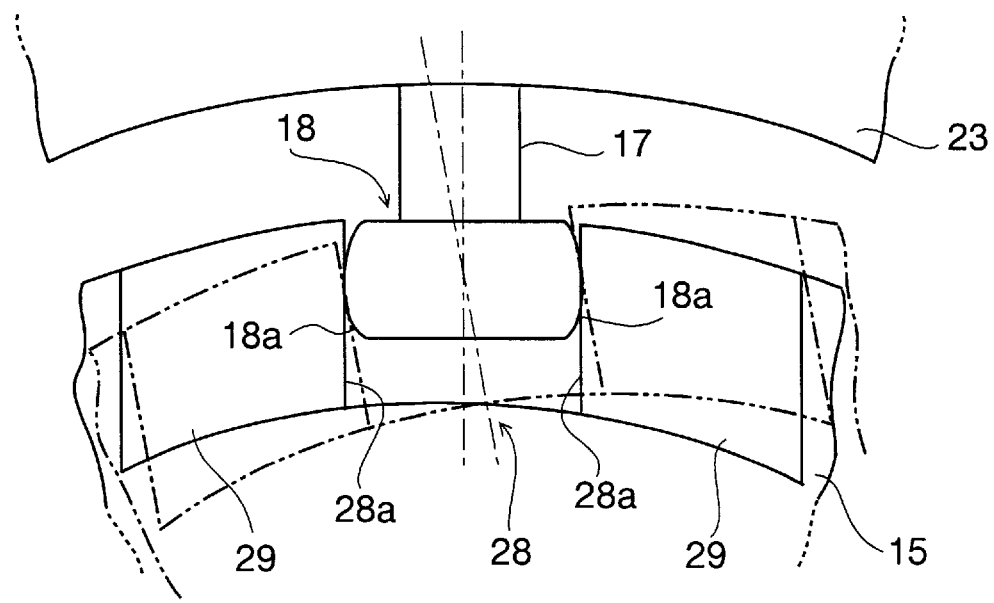
FIG. 8 illustrates an engaging pin and an engaging groove according to a second embodiment of the invention, showing the engagement thereof as in FIG. 7.

FIG. 8 illustrates a second embodiment of the invention. The features that distinguish the second embodiment from the first embodiment will be described below. According to the second embodiment, an engaging pin 17 is fixed to and protrudes radially from an inner peripheral surface of the annular rotating member 23 of the rotational angle detector 19. An engaging groove 28 is formed in the projected part 15 of the steering wheel 11, more specifically, in a location corresponding to the engaging pin 17. The dimensional relationship between the spherical portion 18 of the engaging pin 17 and the engaging groove 28 is substantially the same as in first embodiment.

Since the relationship between the spherical portion 18 and the engaging groove 28 according to the second embodiment remains the same as in the first embodiment, the second embodiment is able to precisely detect the rotational angle of the steering wheel 11 regardless of the rotational direction. In addition, the second embodiment ensures smooth rotation of the annular rotating member 23 of the rotational angle detector 19 by absorbing or releasing twist stress in a case where the annular rotating member 23 and the steering wheel 11 are eccentrically assembled, that is, deviate from the concentric mount positions, and also in a case where the rotational axes of the steering wheel 11 and the annular rotating member 23 are oblique to each other.

Figure 9:
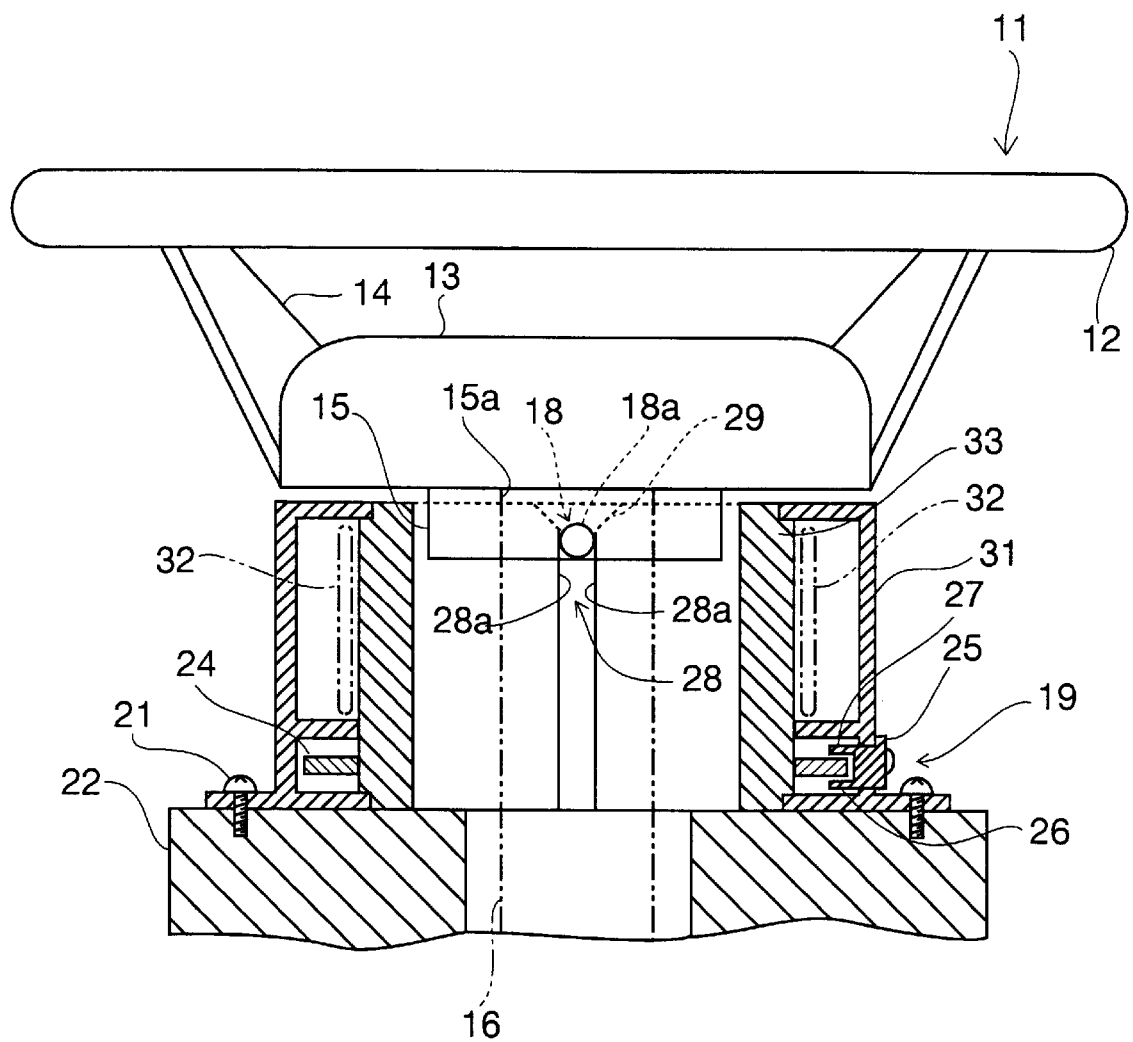
FIG. 9 is a partially sectional side view of a third embodiment of the invention.
Figure 10:
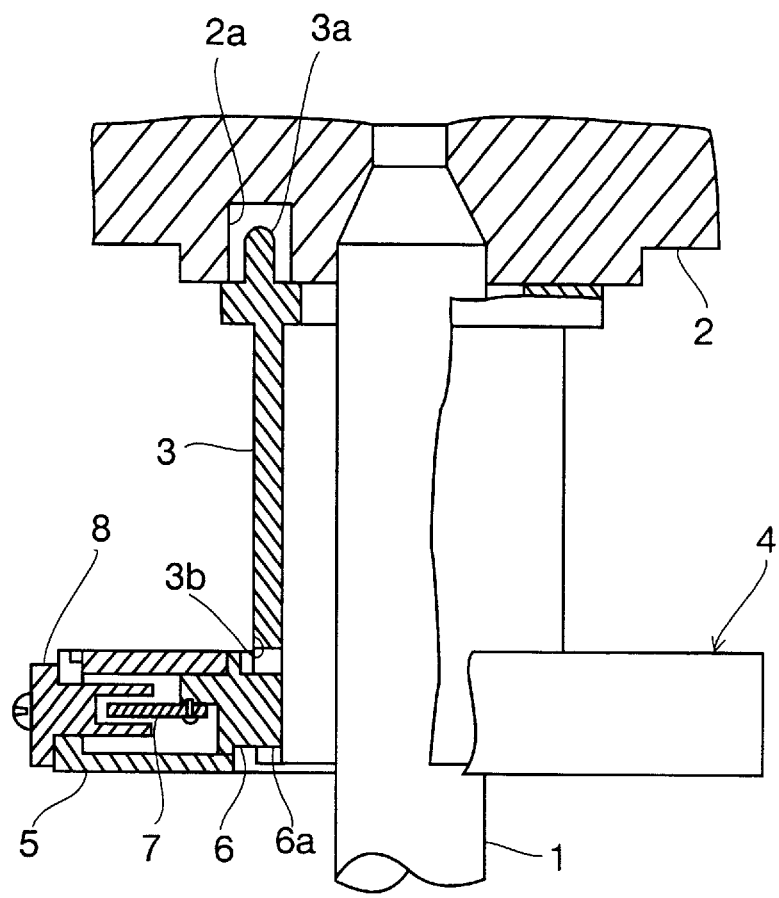
FIG. 10 illustrates a conventional steering wheel rotational angle detecting apparatus.
Figure 11:
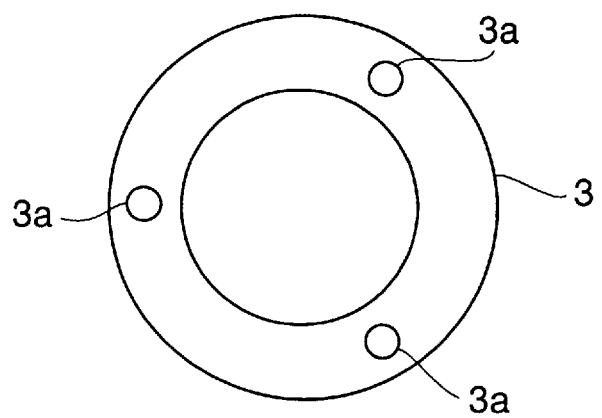
FIG. 11 is a top plan view of a coupling member according to the conventional art.

FIG. 9 illustrates a third embodiment of the invention. The features that distinguish the third embodiment from the first embodiment will be described below. According to the third embodiment, a rotational angle detector 19 is provided in a lower portion of an annular steering roll connector 31, integrated with the annular steering roll connector 31. A flat cable 32 for electric connection between the steering wheel 11 and the steering column 22 is contained in an upper portion of the steering roll connector 31. The flat cable 32 is expandable in accordance with rotation of the steering wheel 11.

An annular rotating member 33 is rotatably disposed in the steering roll connector 31, facing the inner peripheral face of the steering roll connector 31. An engaging groove 28 is formed in a location in the annular rotating member 33 with the depression thereof directed in the direction of the rotational axis, as in the first embodiment. The steering wheel 11 is disposed over the rotational angle detector 19 while the spherical portion 18 of the engaging pin 17 of the steering wheel 11 is held on the sides corresponding to the rotational directions by the flat faces 28a, 28a of the engaging groove 28.

The third embodiment achieves substantially the same advantages as those of the first embodiment.

The invention is not limited to the above-disclosed embodiments, but may be modified or expanded as described below.

The two pairs of light emitting and receiving elements may be integrated or may be separately disposed in positions spaced by a predetermined pitch in the circumferential direction.

It is also possible to provide an engaging pin 17 protruding in the direction of the rotational axis and form an engaging groove in a radial direction.

While the invention has been described with reference to what are presently considered to be preferred embodiments thereof, it is to be understood that the invention is intended to cover further various modifications and equivalent arrangements included within the spirit and scope of the appended claims.

What is claimed is:

1. A steering wheel rotational angle detecting apparatus for detecting rotation of a steering wheel based on rotation of an annular rotating member that is rotatable in accordance with the rotation of the steering wheel, comprising:

an engaging protrusion formed at a position on the steering wheel located adjacent the annular rotating member, the engaging protrusion having a generally spherical portion; and an engaging groove portion formed at a position in the annular rotating member corresponding to the position of the engaging protrusion of the steering wheel, a depression of the engaging groove portion being configured such that when the engaging groove portion is engaged with the engaging protrusion, the engaging groove portion contacts and holds the engaging protrusion while the spherical portion is sandwiched between two faces of the engaging groove portion.

2. The steering wheel rotational angle detecting apparatus according to claim 1, wherein the engaging groove portion has a guide groove portion that is formed in an opening end portion of the engaging groove portion for receiving the engaging protrusion, and the guide groove portion has an opening width greater than a largest diameter of the spherical portion of the engaging protrusion.

3. A steering wheel rotational angle detecting apparatus for detecting rotation of a steering wheel based on rotation of an annular rotating member that is rotatable in accordance with the rotation of the steering wheel, comprising:

an engaging protrusion formed at a position on the annular rotating member located adjacent the steering wheel, the engaging protrusion having a generally spherical portion; and an engaging groove portion formed at a position on the steering wheel corresponding to the position of the engaging protrusion of the annular rotating member, a depression of the engaging groove portion being configured such that when the engaging groove portion is engaged with the engaging protrusion, the engaging groove portion contacts and holds the engaging protrusion while the spherical portion is sandwiched between two faces of the engaging groove portion.

4. The steering wheel rotational angle detecting apparatus according to claim 3, wherein the engaging groove portion has a guide groove portion that is formed in an opening end portion of the engaging groove portion for receiving the engaging protrusion, and the guide groove portion has an opening width greater than a largest diameter of the spherical portion of the engaging protrusion.

5. A linking mechanism between a steering wheel and a steering wheel rotational angle sensor, comprising:

a projection extending from one of a mounting hub of the steering wheel and a rotational member of the sensor; and a groove in the other of the mounting hub and the rotational member, wherein the projection is received in the groove, the projection comprising:

a stem; and an engagement portion having a truncated spherical shape, a first segment removed to provide a first flat surface where joined to the cylindrical stem;

a second segment removed directly opposite to the removed first segment to provide a second flat surface parallel to the first flat surface with curved sides therebetween.

6. The linking mechanism according to claim 5, wherein a width of the groove and a maximum width of the curved sides of the engagement portion are substantially equal and the engagement portion is rotatably received in the groove.

7. The linking mechanism according to claim 5, wherein the groove has a main portion for receiving the engagement portion of the projection and a guide portion for guiding the engagement portion into the main portion.

8. The linking mechanism according to claim 5, wherein the groove is axially aligned with a steering column to which the mounting hub is mounted.

* * * * *